(12) United States Patent
Taoka et al.

(10) Patent No.: US 9,296,394 B2
(45) Date of Patent: Mar. 29, 2016

(54) ENGINE NON-STOP WARNING APPARATUS

(71) Applicants: Yasuhiro Taoka, Toyota (JP); Akemi Toyoda, Toyota (JP)

(72) Inventors: Yasuhiro Taoka, Toyota (JP); Akemi Toyoda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 191 days.

(21) Appl. No.: 14/208,225

(22) Filed: Mar. 13, 2014

(65) Prior Publication Data
US 2014/0288800 A1 Sep. 25, 2014

(30) Foreign Application Priority Data

Mar. 21, 2013 (JP) ................................. 2013-059090

(51) Int. Cl.
  B60W 30/192 (2012.01)
  B60W 50/08 (2012.01)
  B60W 50/14 (2012.01)
  B60W 30/18 (2012.01)

(52) U.S. Cl.
  CPC ....... *B60W 30/192* (2013.01); *B60W 30/18054* (2013.01); *B60W 50/08* (2013.01); *B60W 50/14* (2013.01); *B60W 2050/143* (2013.01); *B60W 2050/146* (2013.01)

(58) Field of Classification Search
  CPC ... B60W 30/192; B60W 50/08; B60W 50/14; B60W 2050/143; B60W 2050/146; F02N 11/106; B60R 25/04; B60R 25/00
  USPC ......... 701/101, 102, 112; 307/10.5; 340/5.72; 123/179.4
  See application file for complete search history.

(56) References Cited

U.S. PATENT DOCUMENTS

| 2004/0004398 A1* | 1/2004 | Nagasaka | B60R 25/02 307/10.5 |
| 2005/0242929 A1 | 11/2005 | Onishi et al. | |
| 2009/0096578 A1* | 4/2009 | Ogino | B60R 25/245 340/5.72 |

FOREIGN PATENT DOCUMENTS

| JP | 4279740 A | 10/1992 |
| JP | 2003205825 A | 7/2003 |
| JP | 2005335675 A | 12/2005 |
| JP | 2006-132501 A | 5/2006 |
| JP | 2007-203883 A | 8/2007 |
| JP | 2007-315003 A | 12/2007 |

OTHER PUBLICATIONS

Translation of communication dated Feb. 10, 2015 from the Japanese Patent Office in counterpart application No. 2013-059090.

* cited by examiner

*Primary Examiner* — Stephen K Cronin
*Assistant Examiner* — Xiao Mo
(74) *Attorney, Agent, or Firm* — Sughrue Mion, PLLC

(57) ABSTRACT

An engine non-stop warning apparatus for a vehicle provided with an engine stop control section configured to stop an engine on condition that a stop switch is continuously pressed for a specified time duration during operation of the engine includes an engine stop determination section configured to determine whether or not the engine is going to stop or stopping by the lapse of the specified time duration after the stop switch is pressed during the operation of the engine, and an engine non-stop warning section configured to warn a vehicle user that the engine is not stopping in a case the engine stop determination section determines that the engine is not going to stop or stopping by the lapse of the specified time duration after the stop switch is pressed during the operation of the engine.

6 Claims, 3 Drawing Sheets

ENGINE NON-STOP WARNING APPARATUS

INCORPORATION BY REFERENCE

The disclosure of Japanese Patent Application No. 2013-059090 filed on Mar. 21, 2013 including the specification, drawings and abstract is incorporated herein by reference in its entirety.

BACKGROUND OF THE INVENTION

1. Field of the Invention

The present invention relates to an engine non-stop warning apparatus and particularly to the engine non-stop warning apparatus that is suitable for warning a vehicle user of non-stop of the engine that is stopped on condition that a stop switch is continuously pressed for a specified time duration during operation of the engine.

2. Description of Related Art

A push-starter and/or stop system has been known that starts or stops the engine on the vehicle by pressing of a push button disposed in the vicinity of a steering wheel on a driver's seat (see Japanese Patent Application Publication No. 2007-203883 (JP 2007-203883 A), for example). This system starts the engine by pressing of the push button by the vehicle user when the engine stops and stops the engine by pressing of the push button by the vehicle user when the engine operates.

Incidentally, there are some push-starter and/or stop systems in which the engine does not stop unless the push button is continuously pressed for a specified time duration (that is, unless the push button is pressed for a while) even when the push button is pressed once. In such a system, unless the pressing of the push button continues for the specified time duration even when the vehicle user presses the push button on purpose, the engine is not going to stop but continues to operate. For this reason, the vehicle user may get off and leave the vehicle even though the engine continues to operate after the push button is pressed.

SUMMARY OF THE INVENTION

One aspect of the present invention provides an engine non-stop warning apparatus that can prevent the vehicle user from getting off the vehicle with the engine continuing to operate when the engine does not stop despite an engine stop operation by the vehicle user.

One aspect of the present invention is an engine non-stop warning apparatus for a vehicle provided with an engine stop control section configured to stop an engine on condition that a stop switch is continuously pressed for a specified time duration during operation of the engine, which includes an engine stop determination section configured to determine whether or not the engine is going to stop or stopping by the lapse of the specified time duration after the stop switch is pressed during the operation of the engine, and an engine non-stop warning section configured to warn a vehicle user that the engine is not stopping in a case the engine stop determination section determines that the engine is not going to stop or stopping by the lapse of the specified time duration after the stop switch is pressed during the operation of the engine.

According to the aspect of the present invention, the vehicle user can be prevented from getting off the vehicle with the engine continuing to operate when the engine does not stop despite the engine stop operation by the vehicle user.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of an engine non-stop warning apparatus according to the present invention will be described specifically with reference to the drawings.

Figure 1:
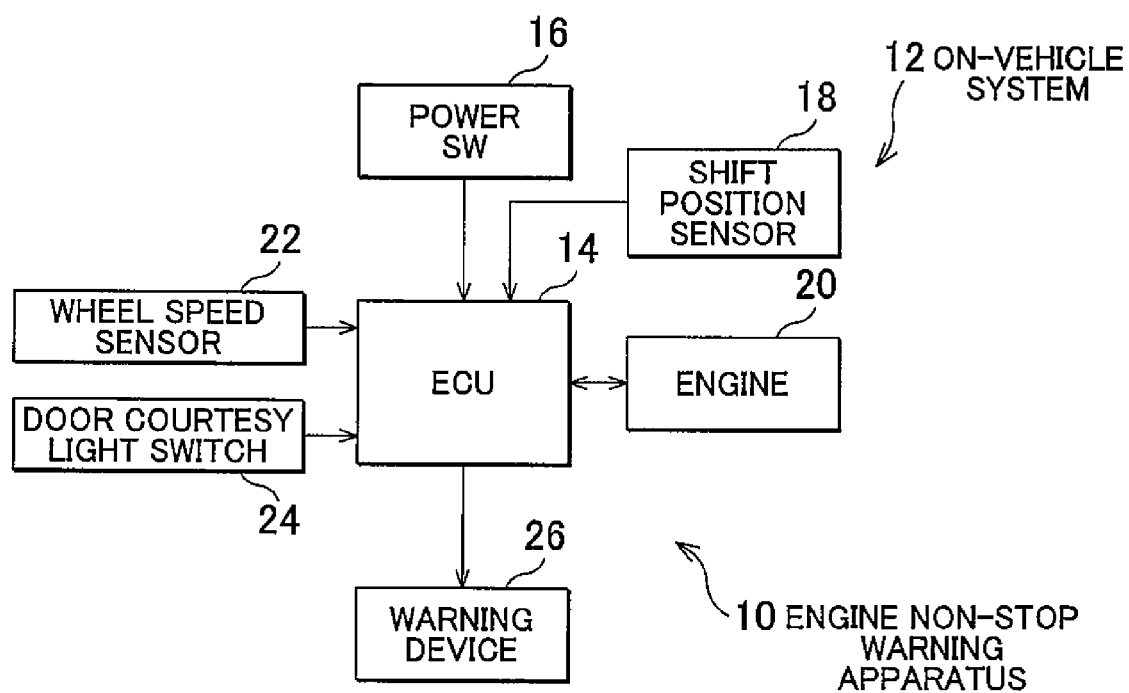
FIG. 1 is a configuration diagram for an on-vehicle system that includes the engine non-stop warning apparatus as an embodiment of the present invention.

FIG. 1 shows a configuration diagram of an on-vehicle system 12 that includes the engine non-stop warning apparatus 10 as an example of the present invention. The on-vehicle system 12 according to this embodiment is mounted on a vehicle and controls operations and/or stops of the engine of the vehicle. It should be noted that the vehicle equipped with the on-vehicle system 12 may be any vehicle that has at least an engine or a hybrid vehicle that is driven by means of the engine and a motor.

The on-vehicle system 12 includes an electronic control unit (hereinafter referred to as an "ECU") 14 that is mainly configured with a microcomputer. The ECU 14 is a device that is capable of controlling a power supply position of the own vehicle, for example, controlling the drive of a power supply relay (specifically, an accessary (ACC) relay or an ignition (IG) relay) as well as the generation of an engine start signal. The ECU 14 is also the electronic control unit that constitutes the engine non-stop warning apparatus 10 for warning a vehicle user (mainly, a vehicle driver) that the engine is not going to stop or is not stopping despite the engine stop operation and controls such a warning.

A power switch 16 is connected to the ECU 14. The power switch 16 is disposed in the vicinity of a steering wheel in a vehicle driver's seat and is a push-type switch that is pressed by the vehicle user. The power switch 16 is pressed when the power supply position of the vehicle is switched among an off-state, an accessary-on state, an ignition-on state, and a stator-on state. A signal that indicates the presence or absence of pressing operation of the power switch 16 is provided to the ECU 14. The ECU 14 determines whether or not the power switch 16 is pressed in accordance with the signal provided from the power switch 16.

The ECU 14 is also connected to a shift position sensor 18. The shift position sensor 18 is a sensor that outputs a signal according to a gearshift position where a gear knob operated by the vehicle user is positioned. An output signal of the shift position sensor 18 is provided to the ECU 14. The ECU 14 detects the gearshift position of the vehicle based on the signal provided from the shift position sensor 18. The ECU 14 then controls the power supply position of the own vehicle based on the determination result of the presence or absence of the pressing operation of the power switch 16 and the detection result of the gearshift position.

The ECU 14 is also connected to an engine 20. The ECU 14 has a function of providing a command signal to the engine 20 and other components in accordance with the power supply position, turns on the power supply relay when the power supply position has to be the ignition-on state, and provides the engine start signal to the engine 20 when the power supply position has to be the stator-on state. Furthermore, the ECU 14 provides an engine stop signal to the engine 20 when the power supply position has to be an ignition-off state.

For example, when the ECU 14 determines that the power switch 16 is pressed in a case where the gearshift position is in a park mode or a neutral mode under a condition that the starter is turned off, the ECU 14 changes the power supply position from the off-state, the accessary-on state, or the ignition-on state to the stator-on state. It should be noted that such a transition of the power supply position may occur only when a signal from a portable key carried by the legitimate vehicle user is checked against the vehicle's ECU for a match and only when the vehicle user depresses the brake pedal.

When the power supply position is switched to the stator-on state, the ECU 14 generates the engine start signal and provides it to, the engine 20, and thus the engine 20 starts. After the start of the engine 20 is completed, the power supply position is switched to the stator-off state, and the engine 20 operates by fuel injection or air suction.

When the ECU 14 determines that the power switch 16 is pressed during the operation of the engine, that is, under a condition that the ignition is turned on, the ECU 14 changes the power supply position from the ignition-on state to the ignition-off state. It should be noted that such a transition of the power supply position may occur only when a signal from a portable key carried by the legitimate vehicle user is checked against the vehicle's ECU for a match and only when the vehicle is at a standstill. When the power supply position is changed as described above, the ECU 14 generates the engine stop signal and provides it to the engine 20, and thus the operation of the engine 20 stops.

The ECU 14 is also connected to a wheel speed sensor 22. The wheel speed sensor 22 is a sensor that outputs a signal according to the speed of vehicle wheels. An output signal of the wheel speed sensor 22 is provided to the ECU 14. The ECU 14 detects wheel speed based on the signal provided from the wheel speed sensor 22 and determines whether or not the vehicle is travelling or at a standstill based on the detection result.

The ECU 14 is also connected to a door courtesy light switch 24. The door courtesy light switch 24 outputs a signal according to opening or closing of a door of the vehicle. An output signal of the door courtesy light switch 24 is provided to the ECU 14. The ECU 14 determines whether or not the vehicle door is opening or closing based on the signal provided from the door courtesy light switch 24. It should be noted that the ECU 14 may determine at least whether or not the vehicle door is opening or closing.

Furthermore, the ECU 14 is connected to a warning device 26. The warning device 26 issues a warning for visual or auditory stimulation to the vehicle user inside the vehicle and includes a warning lamp in an instrument cluster that is lit or blinks for visual stimulation and a buzzer or a loud speaker that sounds for auditory stimulation. The ECU 14 provides a signal that commands the warning device 26 to be activated (activation command signal) when the ECU 14 has to warn the vehicle user as described later. The warning device 26 warns the vehicle user by lighting the lamp or sounding the buzzer in accordance with the activation command signal from the ECU 14.

Figure 2:
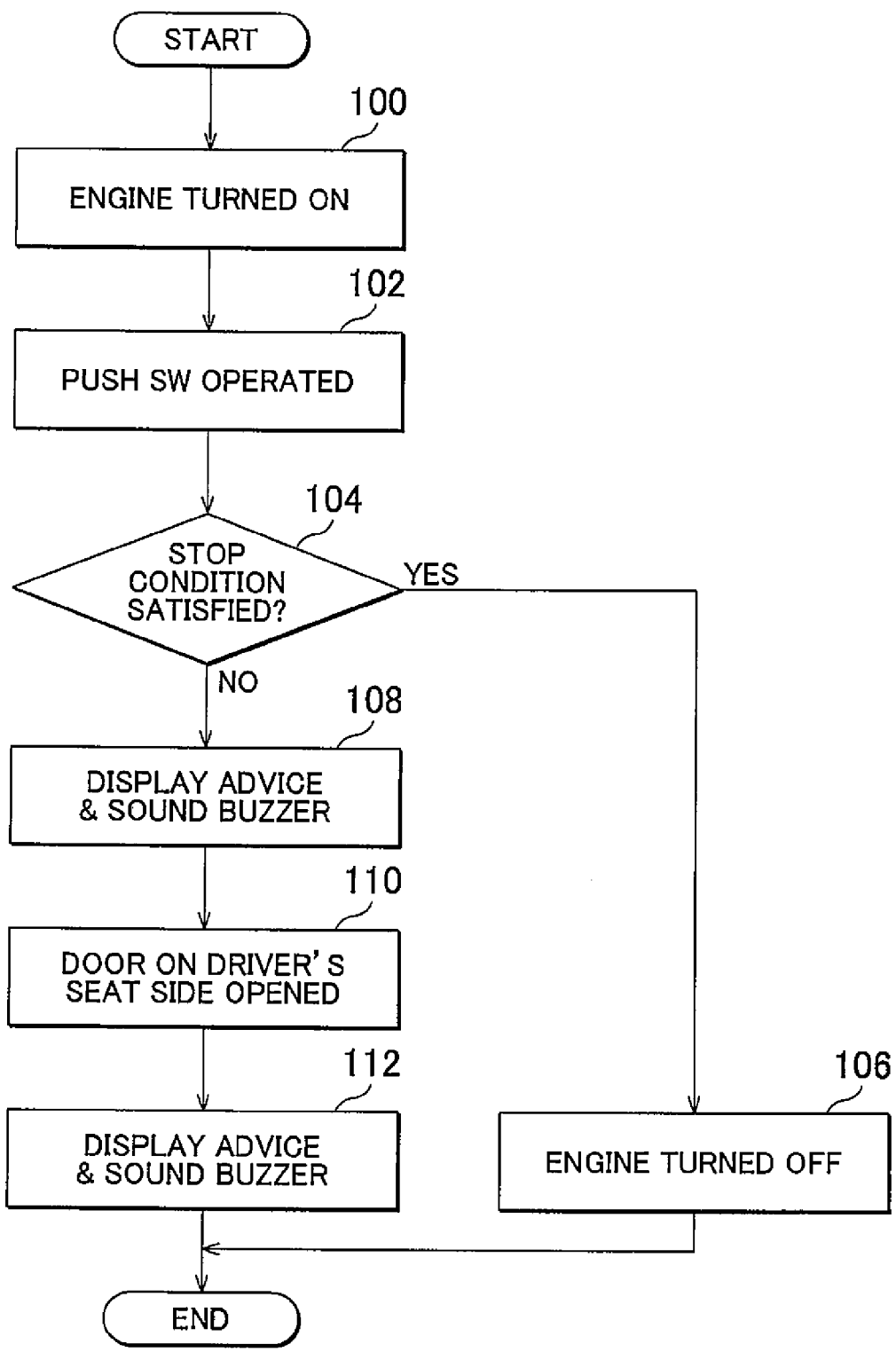
FIG. 2 is a flowchart for one example of a control routine executed during warning control in the engine non-stop warning apparatus according to the embodiment.
Figure 3:
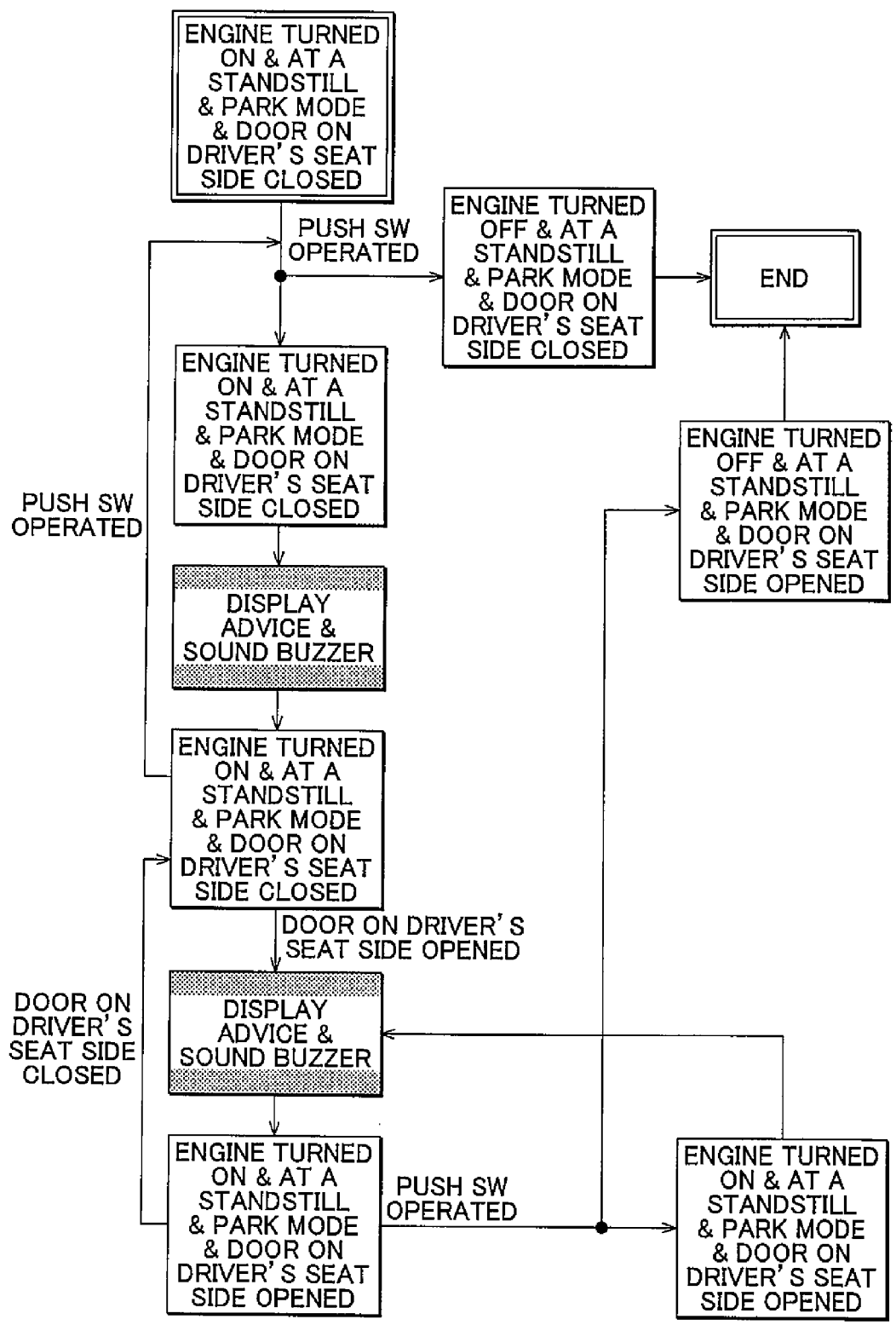
FIG. 3 is an operation transition diagram during the warning control in the engine non-stop warning apparatus according to the embodiment.

Hereinafter, the operation of the engine non-stop warning apparatus 10 according to this embodiment is described with reference to FIGS. 2 and 3. FIG. 2 shows a flowchart for one example of a control routine executed by the ECU 14 during warning control in the engine non-stop warning apparatus 10 of this embodiment. FIG. 3 shows an operation transition diagram during the warning control in the engine non-stop warning apparatus 10 of this embodiment.

In this embodiment, the ECU 14 allows the engine 20 to operate by appropriate fuel injection or air suction on the condition that the power supply position is changed to the ignition-on state after the start of the engine 20 (Step 100). When the ECU 14 determines that the power switch 16 is pressed during the engine operation (Step 102), the ECU 14 determines next whether or not the conditions are satisfied where the power supply position is changed from the ignition-on state to the ignition-off state, that is, the engine 20 is stopped (engine stop condition) (Step 104).

The engine stop condition described above is that the power switch 16 is continuously pressed for a specified time duration T0. The specified time duration T0 cannot be maintained when the vehicle user just instantly presses the power switch 16 but is the minimum duration for which the ECU can determines that the vehicle user purposely presses the power switch 16 for a while. The specified time duration T0 is set at 0.5 sec., 1 sec., or 2 sec., for example. The ECU 14 determines whether or not the power switch 16 that has been pressed once is continuously pressed for the specified time duration T0 in the Step 104.

When the ECU 14 determines that the engine stop condition is satisfied under the condition where the power switch 16 is continuously pressed for the specified time duration T0 in the Step 104, the ECU 14 then determines that the engine 20 has to be stopped. Thus, the ECU 14 changes the power supply position from the ignition-on state to the ignition-off state and provides the engine stop signal to the engine 20 (Step 106). When such a process is executed, the operation of the engine 20 stops.

On the other hand, when the ECU 14 determines that the power switch 16 is not continuously pressed for the specified time duration T0 and the engine stop condition is not satisfied under the condition where in the Step 104, that is, when the ECU 14 determines that the pressing operation of the power switch 16 is started in the Step 102 and then the ECU 14 determines that the pressing operation does not continue for the specified time duration T0 and is cancelled before the specified time duration T0, the ECU 14 then determines that the engine 20 does not stop but continues to operate even after a lapse of the specified time duration T0 from the start of the pressing operation of the power switch 16. Thus, the ECU 14 provides the activation command signal to the warning device 26 so that the warning device 26 has to warn the vehicle user that the engine 20 is not going to stop despite the pressing operation of the power switch 16 (Step 108).

When such a process is executed, the warning device 26 warns the vehicle user that the engine 20 is not going to stop despite the pressing operation of the power switch 16 during the operation of the engine by lighting the lamp, displaying an advice, or sounding the buzzer in accordance with the activation command signal from the ECU 14. In this case, the vehicle user can recognize, by seeing the display of the advice or hearing the buzzer, that the pressing operation of the power switch 16 does not continue for the specified time duration T0 despite the fact that the vehicle user has pressed the power switch 16 once during the operation of the engine and thus the engine 20 is not going to stop as a result in which the condition necessary for stopping the engine 20 is not satisfied. Furthermore, the ECU 14 then determines whether or not the vehicle door (in particular, vehicle door on the driver's seat side) is opened from a closing state in accordance with the signal from the door courtesy light switch 24. As a result, when the ECU 14 determines that the vehicle door is opened (Step 110), the ECU 14 provides the activation command signal to the warning device 26 so that the warning device 26 has to warn the vehicle user that the engine 20 is not stopping despite the pressing operation of the power switch 16 (Step 112).

When such a process is executed, the warning device 26 warns the vehicle user that the engine 20 is not stopping despite the pressing operation of the power switch 16 during the operation of the engine by lighting the lamp, displaying an advice, or sounding the buzzer in accordance with the activation command signal from the ECU 14. In this case, the vehicle user can recognize, by seeing the display of the advice or hearing the buzzer when the vehicle user opens the vehicle door to get off the vehicle, that the pressing operation of the power switch 16 does not continue for the specified time duration T0 despite the fact that the vehicle user has pressed the power switch 16 once during the operation of the engine and thus the engine 20 is not stopping as a result in which the condition necessary for stopping the engine 20 is not satisfied.

As described above, in this embodiment, when it is determined, in the vehicle in which the vehicle user is required to continuously press the power switch 16 for the specified time duration T0 in order to stop the engine 20 during the operation of the engine, that the power switch 16 is once pressed during the operation of the engine but the pressing operation does not continue for the specified time duration T0 thereafter and thus the engine 20 does not stop after the lapse of the specified time duration T0 but continues to operate, the warning device 26 can be used to warn the vehicle user that the engine 20 is not going to stop despite the pressing operation of the power switch 16 during the operation of the engine by displaying the advice or sounding the buzzer.

When such a warning is performed, the vehicle user is given the opportunity to receive notification that the engine 20 is not going to stop despite the pressing operation of the power switch 16 during the operation of the engine. Thus, in the vehicle that requires the vehicle user to continuously press the power switch 16 for the specified time duration T0 in order to stop the engine 20 during the operation of the engine, the vehicle user is prompted to press the power switch 16 for a while to stop the engine 20 when the vehicle user gets off.

Consequently, the vehicle user who presses the power switch 16 once during the operation of the engine can be prevented from getting off and leaving the own vehicle even though the engine 20 continues to operate. Therefore, according to the engine non-stop warning apparatus 10 of this embodiment, when the engine 20 is not going to stop despite the pressing operation of the power switch 16 by the vehicle user during the operation of the engine, the engine non-stop warning apparatus 10 can prevent the vehicle user from getting off the vehicle while the engine 20 continues to operate by warning the vehicle user that the engine 20 is not going to stop.

In this embodiment, a warning to the vehicle user by using the warning device 26 is performed when the power switch 16 is once pressed during the operation of the engine and the pressing operation does not continue for the specified time duration T0 thereafter, and furthermore, when the vehicle door is opened thereafter. According to this embodiment, the assurance of preventing the vehicle user from getting off described above can be improved at this point.

In this embodiment, the vehicle user needs to at least press the power switch 16 once during the operation of the engine at the time when the warning to the vehicle user is performed by using the warning device 26; however, the warning is not performed when the vehicle user does not press the power switch 16 at all during the operation of the engine. In such a case, it can be determined that the vehicle user intends to get off the vehicle during the operation of the engine. According to this embodiment, an unnecessary warning by the warning device 26 can be eliminated at this time, and therefore an appropriate warning can be performed.

It should be noted that the power switch 16 in this embodiment corresponds to a "stop switch" described in claims of the present application. Furthermore, the "engine stop control section" described in claims is achieved by the ECU 14 stopping the engine 20 on the condition that the power switch 16 is continuously pressed for the specified time duration T0 during the operation of the engine: The "engine stop determination section" described in claims is achieved by the ECU 14 determining whether or not the engine 20 is going to stop after the lapse of the specified time duration T0 based on the result whether or not the pressing operation continues for the specified time duration T0 after the power switch 16 is pressed during the operation of the engine. The "engine non-stop warning section" described in claims is achieved by the ECU 14 using the warning device 26 to warn the vehicle user that the engine 20 is not going to stop despite the pressing operation of the power switch 16 during the operation of the engine by displaying the advice or sounding the buzzer when the ECU 14 determines that the pressing operation of the power switch 16 does not continue for the specified time duration T0 after the pressing operation is started during the operation of the engine and thus the engine 20 is not going to stop after the lapse of the specified time duration T0 but continues to operate.

Incidentally, in the embodiment described above, the warning to the vehicle user by using the warning device 26 is performed (1) when the pressing operation of the power switch 16 does not continue for the specified time duration T0 after the pressing operation is started during the operation of the engine and (2) when the vehicle door is opened thereafter; however, the present invention is not limited to this. The warning described above may be performed under at least one of the conditions of (1) and (2) described above.

In the embodiment described above, when the pressing operation of the power switch 16 does not continue for the specified time duration T0 after the pressing operation is started during the operation of the engine, the ECU 14 determines that the engine 20 is not going to stop after the lapse of the specified time duration T0 but continues to operate and thus warns the vehicle user by using the warning device 26. However, the warning may be performed at a timing immediately after the lapse of the specified time duration T0 after the pressing operation of the power switch 16 is started during the operation of the engine or at a timing immediately after the pressing operation of the power switch 16 is cancelled before the specified time duration T0 elapses after the pressing operation is started.

In the embodiment described above, the warning to the vehicle user is performed by using the warning device 26 when the vehicle door is opened under the condition that engine 20 operates after the pressing operation of the power switch 16 is started during the operation of the engine. However, the warning may be performed at a timing immediately after the vehicle door is opened.

In the embodiment described above, the ECU 14 determines whether or not the pressing operation of the power switch 16 continues for the specified time duration T0 after the pressing operation is started during the operation of the engine and also determines whether or not the engine 20 is going to stop after the lapse of the specified time duration T0 based on the determination result. However, the present invention is not limited to this. In place of such a structure, a structure for providing a signal to indicate that the engine 20 is actually stopping or operating (engine operation signal or engine stop signal) from the side of the engine 20 to the ECU 14 may be added, and the ECU 14 may determine whether or not the engine 20 is stopping based on the signal from the side of the engine 20 after the lapse of the specified time duration T0 after the pressing operation of the power switch 16 is started during the operation of the engine.

In such a modification, when it is determined that the engine 20 is not stopping after the lapse of the specified time duration T0 after the pressing operation of the power switch 16 is started during the operation of the engine, the warning to the vehicle user is performed by using the warning device 26. Therefore, such a modification can also achieve the same effect as the embodiment described above.

In the embodiment described above, it is determined whether or not the pressing operation of the power switch 16 continues for the specified time duration T0 after the pressing operation is started during the operation of the engine, and it is also determined whether or not the engine 20 is going to stop after the lapse of the specified time duration T0 based on the determination result. However, the determination whether or not the pressing operation of the power switch 16 continues for the specified time duration T0 may be made by the determination of the time sequence between the timing when the pressing operation of the power switch 16 is cancelled after the pressing operation of the power switch 16 is started during the operation of the engine and the timing when the specified time duration T0 elapses. Also, the determination whether or not the specified time duration T0 elapses at the timing when the pressing operation of the power switch 16 is cancelled after the pressing operation of the power switch 16 is started during the operation of the engine may be applicable.

Additionally, in place of the structure described above, the structure for providing a signal to indicate that the engine 20 is actually stopping or operating (engine operation signal or engine stop signal) from the side of the engine 20 to the ECU 14 may be added, and the ECU 14 may determine whether or not the engine 20 is stopping based on the signal provided from the side of the engine 20 when the pressing operation of the power switch 16 is cancelled after the pressing operation is started during the operation of the engine.

Furthermore, in the embodiment described above, the ECU 14 is directly connected to the engine 20 to control the operation and/or stop of the engine 20. However, the ECU 14 may be connected to an engine ECU that controls the operation and/or stop of the engine 20, and the engine ECU may be allowed to provide various signals.

What is claimed is:

1. An engine non-stop warning apparatus for a vehicle comprising:
    an engine stop control section configured to stop an engine on condition that a stop switch is continuously pressed for a specified time duration during operation of the engine;
    an engine stop determination section configured to determine whether or not the engine is going to stop or stopping by the lapse of the specified time duration, after the stop switch is pressed during the operation of the engine; and
    an engine non-stop warning section configured to warn a vehicle user that the engine is not stopping in a case the engine stop determination section determines that the engine is not going to stop or stopping by the lapse of the specified time duration, after the stop switch is pressed during the operation of the engine.

2. The engine non-stop warning apparatus according to claim 1, wherein
    the engine stop determination section determines whether or not the engine is going to stop after the lapse of the specified time duration based on a result whether or not pressing of the stop switch continues for the specified time duration, after the pressing is started during the operation of the engine, and
    the engine non-stop warning section warns the vehicle user that the engine is not stopping in a case where the engine stop determination section determines that the engine is not going to stop after the lapse of the specified time duration due to the fact that the pressing of the stop switch does not continue for the specified time duration, after the pressing is started during the operation of the engine.

3. The engine non-stop warning apparatus according to claim 1, wherein
    the engine stop determination section determines whether or not the engine is stopping after the specified time duration elapses, after the pressing of the stop switch is started during the operation of the engine, and
    the engine non-stop warning section warns the vehicle user that the engine is not stopping in a case where the engine stop determination section determines that the engine is not stopping after the specified time duration elapses, after the pressing of the stop switch is started during the operation of the engine.

4. The engine non-stop warning apparatus according to claim 1, wherein
    the engine stop determination section determines whether or not the engine is going to stop or stopping by the lapse of the specified time duration when the pressing of the stop switch is cancelled, after the pressing is started during the operation of the engine, and
    the engine non-stop warning section warns the vehicle user that the engine is not stopping in a case where the engine stop determination section determines that the engine is not going to stop or stopping by the lapse of the specified time duration when the pressing of the stop switch is cancelled, after the pressing is started during the operation of the engine.

5. The engine non-stop warning apparatus according to claim 1, wherein
    the engine non-stop warning section warns the vehicle user that the engine is not stopping at a timing when the pressing of the stop switch is cancelled after the pressing is started during the operation of the engine, in a case where the engine stop determination section determines that the engine is not going to stop or stopping by the lapse of the specified time duration.

6. The engine non-stop warning apparatus according to claim 1, wherein
    the engine non-stop warning section warns the vehicle user that the engine is not stopping at a timing when a vehicle door is opened under condition that engine operates after the pressing of the stop switch is started during the operation of the engine, in a case where the engine stop determination section determines that the engine is not going to stop or stopping by the lapse of the specified time duration.

* * * * *